April 29, 1969
I. L. BLOWERS
3,441,856
WIDE SWING MOVING MAGNET METER HAVING FIRST AND SECOND
WINDINGS WITH PARALLEL SPACED AXES
Filed Oct. 23, 1965
Sheet 1 of 3
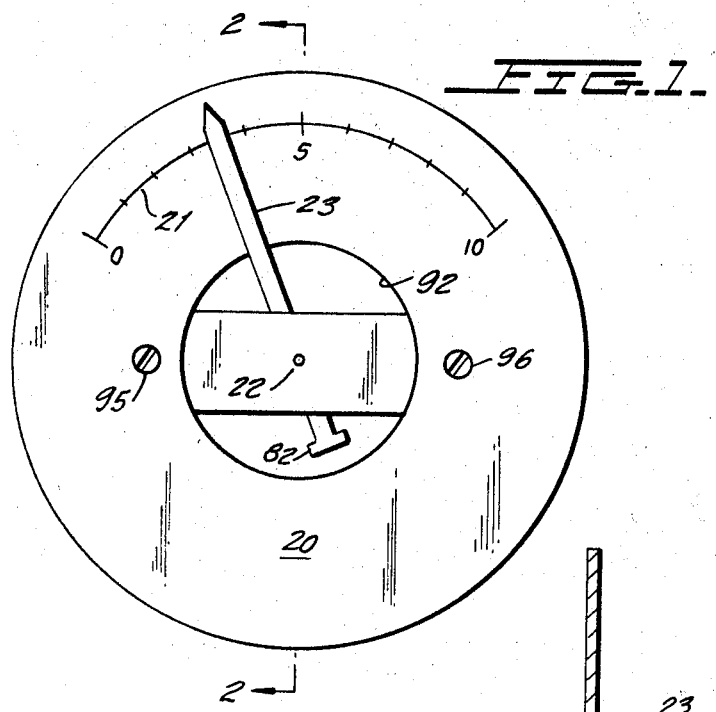
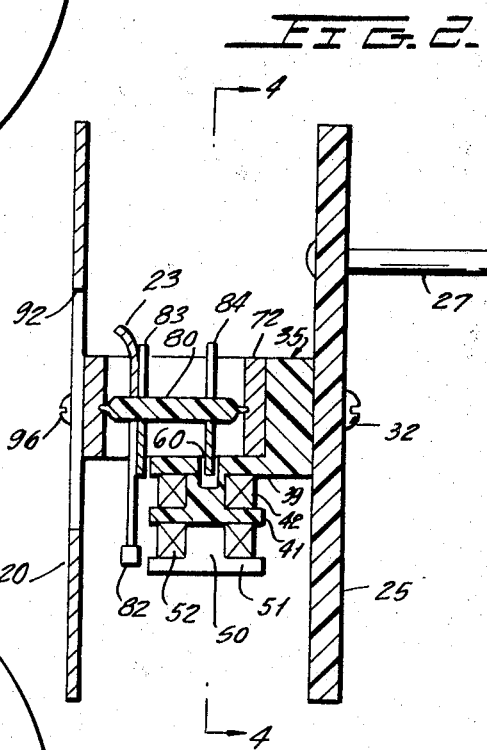
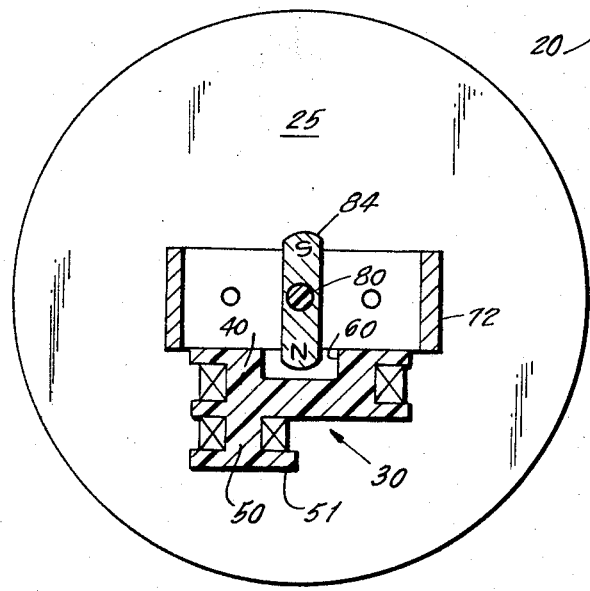
INVENTOR.
IVAN L. BLOWERS
BY
OSTROLENK, FABER, GERB & SOFFEN
ATTORNEYS April 29, 1969     I. L. BLOWERS     3,441,856
WIDE SWING MOVING MAGNET METER HAVING FIRST AND SECOND
WINDINGS WITH PARALLEL SPACED AXES
Filed Oct. 23, 1965
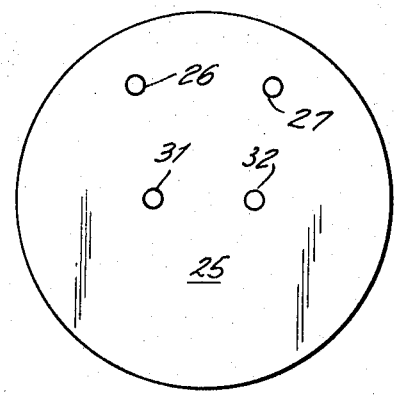
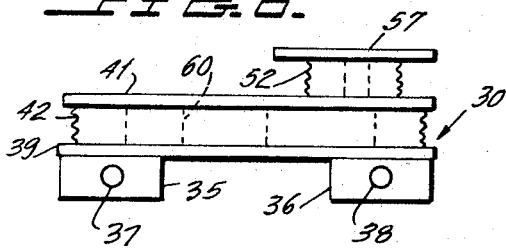
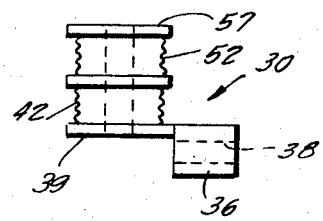
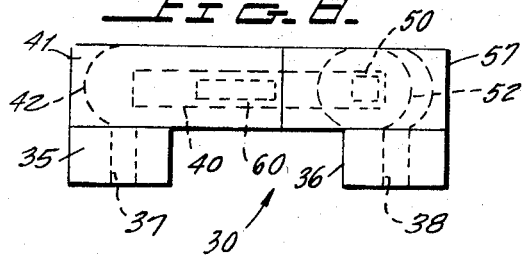
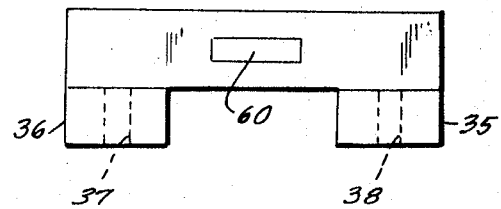
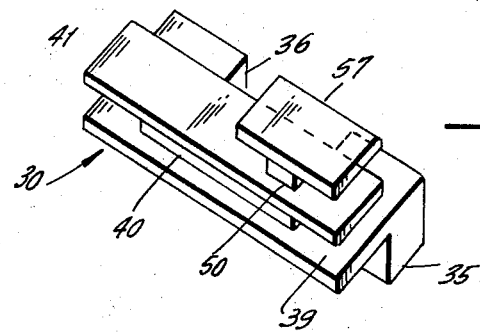
INVENTOR.
IVAN L. BLOWERS
BY
OSTROLENK, FABER, GERB & SOFFEN
ATTORNEYS April 29, 1969     I. L. BLOWERS     3,441,856
WIDE SWING MOVING MAGNET METER HAVING FIRST AND SECOND
WINDINGS WITH PARALLEL SPACED AXES
Filed Oct. 23, 1965     Sheet 3 of 3
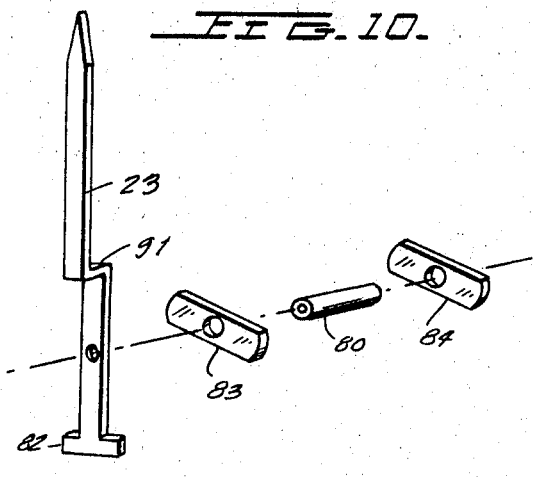
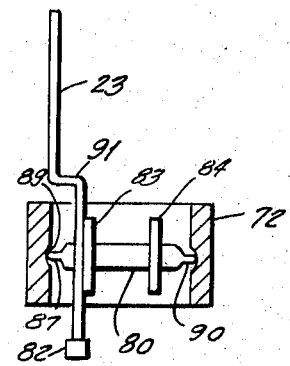
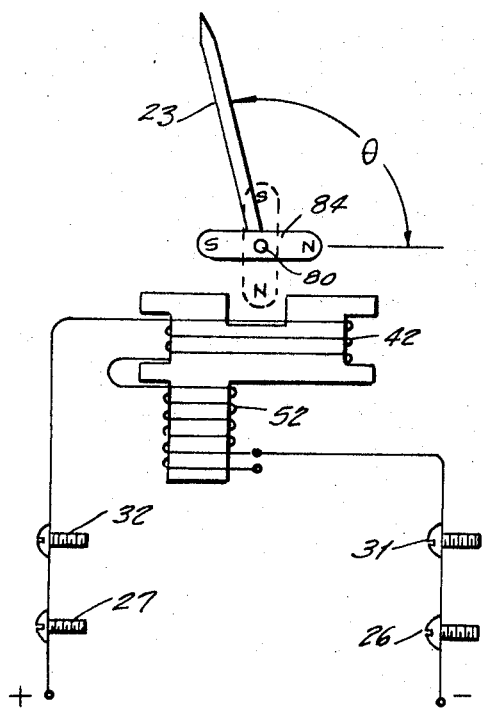
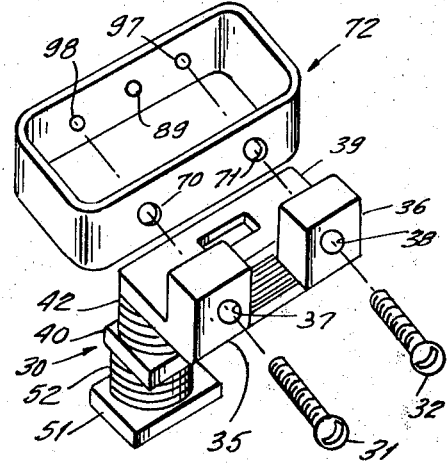
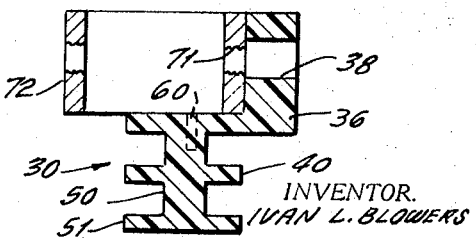
INVENTOR.
IVAN L. BLOWERS
BY
OSTROLENK, FABER, GERB & SOFFEN
ATTORNEYS

United States Patent Office 3,441,856
Patented Apr. 29, 1969

---

3,441,856
WIDE SWING MOVING MAGNET METER HAVING FIRST AND SECOND WINDINGS WITH PARALLEL SPACED AXES
Ivan L. Blowers, Otsego, Mich., assignor to Kal-Equip Company, Otsego, Mich., a corporation of Michigan
Filed Oct. 23, 1965, Ser. No. 504,018
Int. Cl. G01r 1/20, 1/16
U.S. Cl. 324—146       7 Claims

ABSTRACT OF THE DISCLOSURE

An inexpensive ammeter having a pointer movement of greater than 90°. A permanent magnet is connected to the pointer and is driven by the magnetic field generated by two coils which are connected in series and have parallel axes. The axis of the first coil passes through the axis of the rotation of the pointer and the axis of the second coil is displaced from the axis of rotation of the pointer.

This invention relates to a novel ammeter construction, and more specifically relates to a novel ammeter of the moving magnet type which is of inexpensive construction and yet obtains a pointer movement of 90° and more with good linearity over the full scale.

Moving magnet-type ammeters are well known to the art wherein a permanent magnet is fixed to the meter pointer, and is positioned with respect to a coil which carries the current to be measured. As the magnetic field generated by this coil increases from zero to some saturation value, a torque will be applied to the permanent magnet, thereby causing the magnet and pointer to move to some position which is related to the current magnitude in the coil.

In such ammeters, it has been virtually impossible to have a pointer movement, in the absence of gearing and the like, which is greater than approximately 70° to 80°. In addition, the linearity at the beginning and end of even this limited scale range is relatively poor.

The principle of the present invention is to provide a novel coil arrangement which includes an off-axis coil portion for causing a rotation of the moving permanent magnet which is greater than 90° and in which linearity is uniform throughout the complete range.

More particularly, and in accordance with the invention, the magnetic field generating system is comprised of two coil sections. The first coil section is similar to the coil presently used, and is symmetrically located with respect to the moving permanent magnet, whereby the axis of the magnetic field generated by the first coil portion is perpendicular to the axis of rotation of the permanent magnet. Thus, as this field increases in strength, the permanent magnet tends to rotate more and more (or with greater and greater torque) toward the center of the coil. Note that as in the prior art, this coil portion cannot cause the permanent magnet to continue to rotate once it has aligned itself with the axis of the magnetic field generated by the first coil portion.

In accordance with the invention, a second coil portion is placed off-axis with respect to the first coil portion and with respect to the axis of rotation of the permanent magnet. Thus, an additional field is applied to the magnet which can continue to rotate the magnet once it has become parallel to the magnetic axis of the first winding portion. Therefore, the magnet can continue to rotate, as current increases, due to the off-axis field component of the second coil so that the rotation of the permanent magnet will become more linear than in the case of devices having a single coil, and the magnet will have a range of rotation greater than 90°.

Accordingly, a primary object of this invention is to provide a novel permanent magnet ammeter which has a scale range greater than 90°.

Another object of this invention is to improve the linearity of permanent magnet ammeters.

Yet another object of this invention is to provide a novel inexpensive ammeter which has improved linearity.

A further object of this invention is to provide a novel lightweight ammeter.

Yet another object of this invention is to provide a novel ammeter wherein the scale linearity is controlled.

These and other objects of this invention will become apparent from the following description when taken in connection with the drawings, in which:

FIGURE 1 is a front view of an ammeter constructed in accordance with the invention.

FIGURE 2 is a cross-sectional view of FIGURE 1 taken across the line 2—2 in FIGURE 1.

FIGURE 3 is a rear view of the ammeter of FIGURE 1.

FIGURE 4 is a cross-sectional view of FIGURE 2 taken across the line 4—4 in FIGURE 2.

FIGURE 5 is a perspective view of the winding bobbin used for the dual winding of the invention.

FIGURE 6 is a front view of the winding bobbin of FIGURE 5 with the windings placed thereon.

FIGURE 7 is a side view of FIGURE 6.

FIGURE 8 is a top view of FIGURE 6.

FIGURE 9 is a bottom view of FIGURE 6.

FIGURE 10 is an exploded perspective view of the pointer, pointer shaft and permanent magnets used in accordance with the invention.

FIGURE 11 illustrates the manner in which the pointer and magnets of FIGURE 11 are mounted within a support bracket.

FIGURE 12 is an exploded perspective view illustrating the manner in which the bobbin of FIGURES 5 through 9 is connected to the mounting bracket of FIGURE 11.

FIGURE 13 is a cross-sectional view of the assembled bobbin and mounting bracket of FIGURE 12.

FIGURE 14 is a schematic circuit diagram of the novel ammeter of the invention.

Referring now to FIGURES 1 through 4, I have illustrated therein the assembled ammeter of the invention in the absence of its casing which can be of any standard construction. Thus, FIGURES 1 and 2 illustrate the dial surface 20 which has a calibrated scale 21 thereon which will be seen to be a relatively linear scale in that it is not unduly compressed at its beginning and end as is characteristic of most moving magnet ammeters presently on the market which have a scale range of the order of 80°.

It is noteworthy in FIGURE 1 that the angle formed between the pivot point 22 for pointer 23 and the opposite ends of the scale 21 is greater than 90° which has heretofore been impossible in ammeters of the type with which the present invention is concerned.

The main support for the ammeter is comprised of an insulation back-plate 25 which has extending terminal bolts 26 and 27 extending therefrom which serve as the meter terminals as well as the mounting studs for the meter.

A bobbin 30 of any desired insulation material such as nylon is then secured to the back-plate 24 as by screws 31 and 32. The construction of bobbin 30 is best shown in FIGURES 5 through 9 which show the bobbin as a unitary structure having extending mounting ears 35 and 36 which have through-openings 37 and 38, respectively. The mounting ears 35 and 36 are then blended into a lower bobbin platform 39 which has a spool section 40 extending upwardly therefrom and is connected to the upper platform 41. The platforms 39 and 41 together with the spool 40 define a standard bobbin for receiving an elongated winding 42. Note that the winding 42 is the equivalent of the single winding used in prior art moving magnet meters, as will be discussed more fully hereinafter.

In accordance with the invention, a second spool portion 50 extends upwardly from platform 41 and terminates in a second platform 51. It is important to note that the spool 50 is displaced from the center of the spool 40 and receives a second winding portion 52 whose axis is displaced from the axis of winding 42 by approximately .146 inch.

The electrical circuit formed by windings 42 and 52 is illustrated in FIGURE 14 where the positive terminal of the circuit is formed by bolt 27, for example. A connection is then made from bolt 27 to the screw 32 which carries bobbin 30, and the end of winding 42 is then connected to screw 32.

The windings 42 and 52 are then wound on the bobbin in the same direction, and the end terminal of winding 52 is connected to screw 31. An electrical connection is then made from screw 31 to the negative terminal bolt 26.

As shown in FIGURE 14, the axes of windings 42 and 52 are displaced, although they generate magnetic fields in the same direction.

As further shown in FIGURES 4, 8, 9, 12 and 13, a depression or slot 60 is formed in the surface of platform 39 and extends into its spool 40 for the reception of the movement of a permanent magnet, as will be disclosed more fully hereinafter.

The bobbin 30, is best shown in FIGURES 2, 12 and 13, is then secured to the rear plate 26 by the screws 31 and 32 which pass through the openings 37 and 39 in ears 35 and 36, respectively, as well as through suitable through-openings in the plate 25. These screws 31 and 32 then terminate in tapped openings 70 and 71, respectively, (FIGURES 12 and 13) of a rectangular support bracket 72. Note that the bracket 72 nests immediately atop the lower surface of platform 39, as shown in FIGURES 2, 4, 12 and 13.

The metallic bracket 72 further serves to pivotally carry the pointer 23, as best shown in FIGURE 11. More specifically, and referring to FIGURES 11 and 12, a pointer shaft 80 is provided which is force-fitted into opening 81 of pointer 23 which has a counterbalance weight 82 connected to the lower end thereof. In addition, two permanent magnets 83 and 84 are provided with openings 85 and 86 which are also force-fitted on the shaft 80. The shaft 80 is then terminated with projecting nipples 87 and 88 which are sprung into depressions 89 and 90 on the inner opposing surfaces of bracket 72, thereby to rotatably mount shaft 80. Note that a jewel mount arrangement could also be used.

It will also be noted that the pointer 23 has a re-entrant bend 91 therein which permits the pointer to extend beyond the left-hand surface of bracket 72 and through opening 92 in dial surface 20, as shown in FIGURES 1 and 2.

The dial plate 20 is then secured to the bracket 72 as by screws 95 and 96 which are threaded into tapped openings 97 and 98, respectively, shown in FIGURE 12.

The foregoing describes the manner in which the entire assembly is mounted together. It will be noted that the assemblage is extremely simple, and defines a relatively lightweight construction.

It is now possible to consider the operation of the device. It will be noted particularly from FIGURES 2 and 4 that the plane of rotation of permanent magnet 84 includes the depression or slot 60 in bobbin 30. The magnet 84 will be seen to be contained generally centrally of the magnetic field generated by windings 42 and 52, while the magnet 83 is generally located in the return path for these magnetic fields.

Thus, the magnets 83 and 84, which are generally parallel to one another, are oppositely poled with respect to one another. That is to say, if magnet 84 has a south pole at the top and north pole at the bottom, as shown in FIGURE 4, then the magnet 83 which rotates with magnet 84 and pointer 23 will have a north magnetic pole at the top thereof, and a south magnetic pole at the bottom thereof.

In operation, and prior to the application of current to series coils 42 and 52, a magnetic bias will hold the pointer 23 to its zero indicating position on the scale 21 in FIGURE 1. Typically, a magnet of the same material, shape and dimensions as magnets 83 and 84 could be mounted on the back plate coaxially with magnets 83 and 84, and independently rotated to fixed "zeroing" positions.

In the zero position, magnets 83 and 84 will be generally horizontally disposed in FIGURES 2 and 4, and will lie generally perpendicular to the axis of coils 42 and 52. If now a current to be measured is connected to terminals 26 and 27, the windings 42 and 52 will generate a magnetic field. Thus, in FIGURES 4 and 14, the magnetic field generated by windings 42 and 52 will tend to rotate magnet 84 clockwise from the solid line position to the dotted line position. Note that the magnet 83 in the return magnetic circuit will be similarly rotated.

The angular position of magnet 84 will, of course, be functionally related to the current magnitude in windings 42 and 52. In the case of the prior art type magnets, however, once the magnet approached the vertical position shown in the dotted lines, no further rotation was possible. Moreover, the linearity particularly during the end of the range was extremely poor.

In accordance with the present invention, however, and by virtue of the offset coil 52, the axis of which is displaced from the axis of rotation of shaft 80, a continued clockwise rotation of magnet 84 (and of magnet 83) is possible beyond the vertical position shown in FIGURE 14. Thus, the scale range of the instrument is increased by the amount of the continued rotation permissible of magnet 84 due to the offset field created by winding portion 52.

Moreover, the linearity of the angular position of shaft 84 as a function of current through coils 42 and 52 is substantially improved by this offset arrangement.

FIGURE 14 further illustrates that winding 52 may have various taps thereon for adjusting the effect of winding 52 on the movement of permanent magnet 84. This will provide means for adjusting the linearity characteristic of the instrument. That is to say, this permits for the compression or expansion of readings at various scale portions as desired.

As previously mentioned, the oppositely poled magnets 83 and 84 both tend to generate additive torque due to the magnetic field of windings 42 and 52. Note, however, that these magnets will also generate opposing torques due to extraneous magnetic fields, thereby making the instrument less sensitive to extraneous effects.

In a preferred embodiment of the invention, magnets 83 and 84 were permanent magnets made of Cunife material and had a thickness of 0.18 inch, a length of .350 inch and a width of .200 inch. The ends of the magnets were then terminated by a radius of .187 inch which has been found to have considerable effect on the linearity characteristic of the instrument, although the reasons for this are not fully understood.

The winding portion 42 was then formed of 2300 turns, while winding portion 52 was formed of 2300 turns. The axis of windings 42 and 52 were displaced by .146 inch. The axis of rotation of shaft 80 was then spaced on the center of coil 42 and by .146 inch from the center of coil 52. Note that the closer the North pole of magnet 84 gets to the axis of coil 52, the more influential coil 52 becomes on rotating permanent magnet 84 beyond the 90° value.

With this device, a scale range of 100° was obtained with good linearity characteristics throughout the scale.

It was also found important for unexplained reasons at the present time to have the permanent magnets 83 and 84 at an angle of approximately 95° with respect to pointer 23, this angle being shown exaggerated as the angle θ in FIGURE 14 for purposes of improving linearity.

The embodiments of the invention in which an exclusive privilege or property is claimed are defined as follows:

1. An ammeter comprising a dial, a pointer rotatably movable with respect to said dial, a pointer shaft connected to said pointer and rotatable threwith; an elongated permanent magnet connected to said pointer shaft and rotatable therewtih; said pointer and said permanent magnet perpendicular to said shaft; pivotal support means for pivotally mounting said shaft, and an electrical coil positioned adjacent said permanent magnet and carrying the current to be measured by said ammeter; said electrical coil having a first and second series connected winding portion; said first and second winding portions disposed adjacent one another and lying in parallel planes; said first winding portion having an axis generally perpendicular to and passing through said shaft and extending through the plane of rotation of said permanent magnet; said second winding portion having an axis displaced from and parallel to the axis of said first winding and generally extending through said plane of rotation of said permanent magnet; said dial having a scale thereon; said scale extending over an angle of greater than 90° as measured from the axis of said shaft.

2. An ammeter comprising a dial, a pointer rotatably movable with respect to said dial, a pointer shaft connected to said pointer and rotatable therewith; an elongated permanent magnet connected to said pointer shaft and rotatable therewith; said pointer and said permanent magnet perpendicular to said shaft; pivotal support means for pivotally mounting said shaft, and an electrical coil positioned adjacent said permanent magnet and carrying the current to be measured by said ammeter; said electircal coil having a first and second series connected winding portion; said first and second winding portions disposed adjacent one another and lying in parallel planes; said first winding portion having an axis generally perpendicular to and passing through said shaft and extending through the plane of rotation of said permanent magnet; said second winding portion having an axis displaced from and parallel to the axis of said first winding and generally extending through said plane of rotation of said permanent magnet; and a second permanent magnet secured to said shaft and rotatable therewith; said second permanent magnet having a plane of rotation external to the exterior of said coil and lying in the return path of the magnetic field of said coil; said second permanent magnet being poled oppositely to said permanent magnet.

3. An ammeter comprising a dial, a pointer rotatably movable with respect to said dial, a pointer shaft connected to said pointer and rotatable therewith; an elongated permanent magnet connected to said pointer shaft and rotatable therewith; said pointer and said permanent magnet perpendicular to said shaft; pivotal support means for pivotally mounting said shaft, and an electrical coil positioned adjacent said permanent magnet and carrying the current to be measured by said ammeter; said electrical coil having a first and second series connected winding portion; said first winding portion having an axis generally perpendicular to and passing through said shaft and extending through the plane of rotation of said permanent magnet; said second winding portion having an axis displaced from and parallel to the axis of said first winding and generally extending through said plane of rotation of said permanent magnet; and a bobbin for said first and second windings; said bobbin comprising first and second axially spaced spool sections separated by a central platform; said first and second windings wound on said first and second spools, respectively; the axes of said first and second spools displaced from one another and parallel to one another.

4. An ammeter comprising a dial, a pointer rotatably movable with respect to said dial, a pointer shaft connected to said pointer and rotatable therewith; an elongated permanent magnet connected to said pointer shaft and rotatable therewith; said pointer and said permanent magnet perpendicular to said shaft, and an electrical coil positioned adjacent said permanent magnet and carrying the current to be measured by said ammeter; said electrical coil having a first and second series connected winding portion; said first winding portion having an axis generally perpendicular to and passing through said shaft and extending through the plane of rotation of said permanent magnet; said second winding portion having an axis displaced from and parallel to the axis of said first winding and generally extending through said plane of rotation of said permanent magnet; and a bobbin for said first and second windings; said pobbin comprising first and second axially spaced spool sections separated by a central platform; said first and second windings wound on said first and second spools, respectively; the axes of said first and second spools displaced from one another and parallel to one another; and a rectangular support bracket; said shaft pivotally mounted between opposite sides of said rectangular support bracket; said bobbin connected to a third side of said support bracket and extending over one end of said support bracket; said dial connected to the fourth side of said support bracket.

5. The device substantially as set forth in claim 1 wherein said permanent magnet is comprised of a flat elongated member having generally rounded ends.

6. The device substantially as set forth in claim 5 wherein said permanent magnet forms an angle of approximately 95° with said pointer.

7. The device substantially as set forth in claim 1 wherein said second winding has taps thereon for adjustment of scale linearity.

References Cited

UNITED STATES PATENTS

| | | | |
|---|---|---|---|
| 1,656,116 | 1/1928 | Hull | 324—147 X |
| 1,745,603 | 2/1930 | Cheney | 324—147 X |
| 2,849,679 | 8/1958 | Bartlett | 324—146 X |
| 2,978,639 | 4/1961 | Lawson | 324—132 X |
| 3,094,659 | 6/1963 | Pfeffer | 324—146 |

RUDOLPH V. ROLINEC, *Primary Examiner.*

A. E. SMITH, *Assistant Examiner.*

U.S. Cl. X.R.

324—154